United States Patent [19]

Hurley et al.

[11] 4,029,725

[45] June 14, 1977

[54] NONOXIDATIVE PROCESS FOR PURIFYING AQUEOUS INORGANIC SALT SOLUTIONS EMPLOYED IN THE WET SPINNING OF FILAMENTARY VINYL POLYMERS

[75] Inventors: Rupert B. Hurley, Wiliamsburg; Frederick B. Eastwood, Gloucester; Joe A. Mann, Williamsburg, all of Va.

[73] Assignee: Dow Badische Company, Williamburg, Va.

[22] Filed: Apr. 2, 1976

[21] Appl. No.: 672,892

[52] U.S. Cl. .......................... 264/38; 260/29.6 AN; 264/182
[51] Int. Cl.² ......................................... D01F 13/00
[58] Field of Search .................... 264/169, 182, 38; 260/29.6 AN

[56] References Cited

UNITED STATES PATENTS

| | | | |
|---|---|---|---|
| 2,364,407 | 12/1944 | Walker | 264/38 |
| 3,574,177 | 4/1971 | Nakajima et al. | 260/29.6 AN |
| 3,632,543 | 1/1972 | Nakanome et al. | 260/29.6 AN |
| 3,632,699 | 1/1972 | Wilson et al. | 264/38 |
| 3,702,880 | 11/1972 | Matsushita et al. | 264/38 |
| 3,776,994 | 12/1973 | Yoshioka et al. | 264/109 |

*Primary Examiner*—Jay H. Woo
*Attorney, Agent, or Firm*—George F. Helfrich

[57] ABSTRACT

Filamentary vinyl polymer compositions are commonly prepared according to a procedure which includes the following steps:

a. polymerizing a vinyl monomer in a concentrated aqueous inorganic salt solution to produce a vinyl polymer solution;

b. spinning the resulting vinyl polymer solution through a spinnerette into a coagulating bath containing an aqueous solution of the same inorganic salt as that employed in the polymerization step, the concentration of inorganic salt in the coagulating bath being maintained at a level which affords precipitation of the vinyl polymer to form a coherent filamentary gel;

c. washing the vinyl polymer filamentary gel so produced;

d. recovering the concentrated aqueous inorganic salt solution from the washing and coagulation steps by concentrating the combined effluents thereof; and e. recycling the recovered concentrated aqueous inorganic salt solution into the polymerizing step.

In such a process, undesirable metallic ion and organic molecular impurities accumulate in the recovered concentrated aqueous inorganic salt solution. According to the present invention, which is an improvement in such a process, the recovered aqueous inorganic salt solution is purified prior to the recycling and use thereof by complexing the metallic ion impurities and adsorbing the resulting metal complexes along with organic molecular impurities on activated carbon.

5 Claims, No Drawings

NONOXIDATIVE PROCESS FOR PURIFYING AQUEOUS INORGANIC SALT SOLUTIONS EMPLOYED IN THE WET SPINNING OF FILAMENTARY VINYL POLYMERS

BACKGROUND OF THE INVENTION

1. Field of the Invention

The present invention relates generally to a process for plastic article shaping. In particular, it relates to the recycling of reclaimed and purified process material, especially of extrudant-receiving bath material.

2. Prior Art

In the continuous production of filamentary vinyl polymer compositions by the wet spinning technique, it is well-known, common practice to polymerize a chosen vinyl monomer composition in a concentrated aqueous inorganic salt solution and to spin the resulting vinyl polymer solution into a coagulating bath which contains an aqueous solution of the same inorganic salt as that employed in the polymerization step. In the coagulation bath, the concentration of inorganic salt is maintained at a level which affords precipitation of the vinyl polymer to form a coherent filamentary gel. The vinyl polymer filamentary gel is then washed, and the inorganic salt is recovered as a concentrated solution from both the washing and coagulation baths by concentrating the effluents thereof. Such concentrated aqueous inorganic salt solution is recycled into the polymerization step for the purpose of economy of operation of the process. See e.g. U.S. Pat. Nos. 2,916,348 and 2,558,730.

However, in the recovery of the inorganic salt from washing and coagulation bath effluents, unreacted monomer, low molecular weight polymer, and a number of other organic molecular impurities, as well as metallic ion impurities accumulate, adversely affecting solution polymerization activity in addition to the final quality of the filamentary vinyl polymer product.

As a consequence, a number of processes for purifying the recovered concentrated inorganic salt solution prior to the recycling thereof have been proposed. Exemplary of the more noteworthy of these processes are those described and claimed in U.S. Pat. Nos. 3,702,880 and 3,107,971; and Japanese Pat. Nos. 16,932/67 and 27,248/67. Of these the most generally applicable and most highly efficacious processes are those which comprehend an oxidative treatment employing oxidation agents such as hydrogen peroxide, water-soluble persulfates, sodium hypochlorite, sodium chlorate or perchlorate, and potassium permanganate. Howsoever effectual these and like oxidative processes might be, they are found wanting in view of one or more of the following disadvantages: (a) Vinyl monomers are capable of being oxidized to oxalic acid and oxalates, which form precipitates with certain metallic ions, notably zinc, thereby interfering with both the solution polymerization and the spinning of the polymer solution. (b) The introduction of cations such as $Na^+$ and $K^+$ can result in the formation of precipitates such as $MZnCl_3$ when concentrated aqueous solutions of the inorganic salt $ZnCl_2$ are cooled. (c) The employment of permanganate oxidizing agents results in the undesirable introduction into the system of manganous ion, which is both a chain terminator and a chain transfer agent, and as such seriously interferes with the vinyl polymerization. (d) Certain organic impurities present in the aqueous inorganic salt solution are oxidized to form complexing agents, which significantly affect the rate of vinyl polymerization.

SUMMARY OF THE INVENTION

Accordingly, it is the primary object of the present invention to provide an efficient, non-oxidative process for the purification of a recovered aqueous inorganic salt solution prior to the recycling thereof into the polymerization step in a continuous process for producing a filamentary vinyl polymer by the wet spinning of a vinyl polymer solution.

In accordance with the present invention, this object has been achieved, and the disadvantages presented by prior art processes have been obviated, by the practice of a procedure which comprehends complexing the metallic ion impurities present in the recovered aqueous inorganic salt solution and absorbing the resulting metal complexes along with organic molecular impurities on activated carbon.

Highly beneficial results are obtained when the vinyl polymer is an acrylonitrile polymer or interpolymer, e.g., poly (acrylonitrile); or an acrylic copolymer or terpolymer having at least about 85 weight percent of acrylonitrile and up to about 15 weight percent of another polymerizable mono-olefinic monomer copolymerizable therewith; or a modacrylic polymer. Such highly beneficial results are also obtained when the aqueous inorganic salt solution comprises zinc chloride as the principal inorganic salt component, the polymerization step is accomplished utilizing a peroxide initiator system, and the principal metallic ion impurity is ferric ion.

Especially advantageous results are obtained when complexation of the metallic ion impurities is accomplished by means of a complexing agent selected from the group consisting of tartronic acid, dihydroxytartaric acid, ethylenediaminetetraacetic acid, 2, 4-pentanedione.

Furthermore, it has been found of decided advantage under certain conditions to introduce into the recovered concentrated aqueous inorganic salt solution, prior to the recylcing thereof, a polymerization activator selected from the group consisting of tartronic acid, dihydroxytartaric acid, ethylenediaminetetraacetic acid, and water-soluble aldehydes, in an amount sufficient for the maintenance of acceptable polymerization activity.

DESCRIPTION OF THE PREFERRED EMBODIMENTS

For a more complete understanding of the present invention, including its object and benefits, reference should be made to the description of the preferred embodiments thereof, which is set forth in detail below.

The present invention presents an improvement in well-known and commonly-employed continuous processes for producing filamentary vinyl polymers — i.e., those prepared by the polymerization and interpolymerization of compounds of the types $CH_2 = CHX$ and $CH_2 = CXY$ — by the wet spinning technique. Exemplary of vinyl polymers having especial utility are acrylonitrile polymers or interpolymers such as: poly (acrylonitrile); acrylic copolymers and terpolymers containing at least about 85 percent of acrylonitrile and up to about 15 percent of other monomers such as vinyl acetate, methyl methacrylate and other alkyl esters of methacrylic acid, methyl acrylate and other esters of acrylic acid, vinyl bromide, vinyl monomers having an affinity for acid dyestuffs, particularly those having a tertiary or quarternary nitrogen in the molecule such as vinyl pyridine or methyl vinyl pyridine, vinyl monomers having an affinity for basic dyestuffs, particularly those having a sulfonic or carboxylic acid group such as alkyl sulfonic acid and itaconic acid; and modacrylic polymers, exemplary of which is the following composition: 84 percent acrylonitrile; 10 percent methyl acrylate, 5 percent vinyl bromide, and 1 percent 2-sulfoethyl methacrylic acid.

In such processes, the vinyl monomer or mixture of vinyl monomers is first polymerized in a concentrated aqueous inorganic salt solution to produce a solution of the vinyl polymer. Examples of inorganic salts commonly and advantageously employed commercially are zinc chloride, sodium and calcium thiocyanates, and nitric acid. Initiators conveniently and beneficially utilized in such polymerizations include hydrogen peroxide/ferric ion systems; sodium, potassium, or ammonium peroxydisulfates; and $\alpha,\alpha'$-azobisobutyronitrile; and other like materials.

The resulting vinyl polymer solution is then extruded through a spinnerette into a coagulating bath which affords a controlled precipitation of the vinyl polymer from solution to form a coherent filamentary gel. In the coagulating bath the coagulating liquid is normally an aqueous solution of the same inorganic salt as that employed in the polymerization step, in order to simplify the recovery problem and effect economy of operation. The concentration of inorganic salt in the coagulating bath is maintained at a level to ensure that the solution thereof is a non-solvent for the vinyl polymer, and precipitation of the vinyl polymer to form a coherent filamentary gel is thereby afforded. The temperature of the coagulating bath is generally carefully controlled within certain empirically-determined limits, in order to ensure that the precipitated filamentary gel is substantially clear and tough and can be subsequently stretched to orient the molecules thereof, thereby enhancing the tensile strength and toughness of the filament.

Following coagulation, the filamentary vinyl polymer is washed — generally countercurrently with water — to remove the inorganic salt, which is subsequently recovered as a concentrated solution from the washing and coagulating steps by concentrating (as by evaporating) the combined effluents thereof. Such concentrated aqueous inorganic salt solution is then recycled into the polymerization step, and the filamentary vinyl polymer is then stretched, finished, crimped, dried, cut, and baled, or packaged in a tow, by well-known, standard procedures. A review of many of the well-known and commonly-employed such processes, upon which the improvement of the present invention is based, may be found in C. W. Davis and Paul Shapiro, "Acrylic Fibers," Encyclopedia of Polymer Science and Technology, *Volume I*, page 342*ff*, Interscience, New York, 1970.

In such a process as set forth above, wherein the inorganic salt is recovered as a concentrated solution from the washing and coagulation steps by combining the effluents thereof and concentrating the same, as by evaporation, and wherein such recovered concentrated aqueous inorganic salt solution is recycled into the polymerization step, unreacted monomer, low molecular weight polymer, and a number of other organic molecular impurities, as well as metallic ion impurities accumulate, resulting in an adverse effect upon both polymerization activity and the final quality of the filamentary vinyl polymer product. To particularize, when the aqueous inorganic salt solution comprises zinc chloride as the principal inorganic salt component and the polymerization step is accomplished utilizing a peroxide initiator system, the principal metallic ion impurity is ferric ion. This is so because zinc chloride solutions slowly attack the stainless steel equipment which is almost universally employed in such processes, thereby dissolving iron and adding ferric ions to the system. Such additional ferric ions are considered as contaminants or impurities and must be removed, since the concentration of ferric ions in the feed to the polymerization reactor must be carefully controlled, as is clear from the following relationships describing the main reactions involved in the polymerization of a vinyl monomer such as acrylonitrile in an aqueous zinc chloride solution employing a peroxide initiator system:

| | | |
|---|---|---|
| Initiator Formation | 1. | $Fe^{++} + H_2O_2 \longrightarrow H\bar{O} + HO\cdot + Fe^{+3}$ |
| Initiator Destruction | 2. | $HO\cdot + Cu^{+1} \longrightarrow HO^-HO^- + Cu^{+2}$ |
| | 3. | $HO\cdot + Fe^{+2} \longrightarrow HO^- + Fe^{+3}$ |
| Initiation | 4. | $HO\cdot + M \longrightarrow R_1\cdot$ |
| Propagation | 5. | $R_i\cdot + M \longrightarrow R_{i+1}\cdot$ |
| Termination | 6. | $R_i + Cu^{+2} + Cl^- \longrightarrow RCl + Cu^+$ |
| | 7. | $R_i + Fe^{+3} + Cl^- \longrightarrow RCl + Fe^{+2}$ |

Moreover, an increase in the concentration of iron in the zinc chloride solution can result in an increase in the iron content of the final filamentary product, thereby lowering the heat stability thereof.

Organic molecular oxidation products of (a) unreacted monomer (and comonomer(s) and/or (b) low molecular weight polymeric material in the concentrated aqueous inorganic salt solution may also act as chain terminators or chain transfer agents, or even as activators in the polymerization step. Careful control of the polymerization reaction accordingly requires their removal.

The improvement according to the present invention comprises purifying the recovered aqueous inorganic salt solution prior to the recycling and re-use thereof by complexing the metallic ion impurities and removing the resulting metal complexes along with organic molecular impurities by adsorption thereof on activated carbon.

To determine which complexing agent(s) should be employed, one should first examine standard listings of those which are known in the art as effective sequestering agents for the metallic ions to be removed. However, the final choice(s) must be made only after careful empirical evaluation, in view of the significant influence on the complexation reaction which can be presented by both low and high concentrations of inorganic salt in the recovered aqueous inorganic salt solution and the particular initiator employed in the polymerization reaction. For example, when the recovered aqueous inorganic salt solution comprises zinc chloride in concentrations between about 5 and 60 percent by weight, and when the principal metallic ion impurity is ferric ion, a number of compounds which are known as good complexing agents for ferric ion in aqueous solution are completely ineffective under the instant conditions. Included in this group are tartaric acid, malonic acid, and citric acid. Furthermore, other agents, such as hydroxylamine and ascorbic acid, react directly with initiators such as hydrogen peroxide, and are therefore to be avoided. As actually determined empirically, tartronic acid, dihydroxytartaric acid, ethylenediaminetetraacetic acid, and 2, 4-pentanedione are most effective complexing agents for ferric ion impurities when the recovered aqueous inorganic salt solution comprises zinc chloride as the principal inorganic salt component and the polymerization step is accomplished using a peroxide initiator system. The amount of complexing agent to be added to the recovered inorganic salt solution is determined empirically, as it is primarily dependent upon the nature of the complexing agent employed and the nature and amount of metallic ion impurities in the solution. By way of example, when zinc chloride is the predominant inorganic salt component of the solution and ferric ion is the principal metallic ion impurity, a concentration or tartronic acid of between 10 and 200 ppm is advantageously employed for ferric ion concentrations between 5 and 50 ppm. As is readily understood by those of skill in the art, it is possible under certain conditions to generate effective complexing agents with the inorganic salt solution in situ — either by design, or as a natural consequence of the compounds normally present therein and the conditions generally obtaining.

The complexing of metallic ion impurities and removal of the metal complexes and organic molecular impurities may be effected in the recovered aqueous inorganic salt solution either before or after the concentration thereof, which is readily and conveniently accomplished by evaporation of water therefrom, as by heating. However, it has been found of advantage under certain conditions to carry out the procedure of the present invention before final concentration of the recovered aqueous inorganic salt solution, because of a more efficient adsorption of some of the impurities on activated carbon in moderately concentrated solutions. By way of example, when zinc chloride is the major inorganic salt component of the recovered solution, concentrations of 25–40 percent by weight appear optimum for the purification treatment of the present invention. Such concentrations are therefore to be preferred over concentrations of 50–60 percent by weight, which are typical for recycle salt solutions being introduced into the polymerization step.

The temperature of the inorganic salt solution to be treated may vary between wide limits (e.g., from 0° to 60° C) without any adverse effect on the efficiency of the process according to the present invention. However, temperatures of 15° to 30° C are very conveniently employed.

The optimum pH of the inorganic salt solution to be treated according to the present invention should be carefully determined empirically, as both the complexation and adsorption processes are affected by changes in pH. By way of example, when the predominant inorganic salt component is zinc chloride, the pH of the solution to be treated should be between about 1.0 and 6.0, (on a 10 percent zinc chloride basis) with the range 5.0 to 5.5 being especially preferred because of optimum adsorption of iron (III) complexes on activated carbon within such a range.

The activated carbon to be utilized in the practice of the present invention may be one of a number of readily available commercial products, of which the following brands are examples: DARCO S-51, NORITE SS, and NUCHAR D-12. As is understood by those of skill in the art, the mechanism of adsorption on activated carbon comprehends physical entrapment coupled with physico-chemical bonding. The activated carbon to be employed is first thoroughly washed with mineral acids followed by water to remove extractable inorganic constituents. It is then added to the recovered inorganic salt solution in an amount sufficient to provide between about 0.01 and 5 percent by weight, based on the total weight of the solution. Concentrations of between 0.1 and 0.5 percent have been employed with very beneficial results. The solution to which the activated carbon has been added is then agitated with a mechanical stirrer for at least 1 minute, and preferably from 15 minutes to 1 hour. Following agitation, the inorganic salt solution is filtered, the solution is concentrated further (e.g., in the case of $ZnCl_2$ to about 60 percent), the pH is adjusted to the proper level for the subsequent polymerization step (e.g., in the case of $ZnCl_2$ to about 3.0), and the solution is then introduced into the polymerization reactor at a predetermined rate, so that desired conditions inside the reactor will result.

When metallic ion impurities such as ferric and ferrous ions are present in the inorganic salt solutions, an additional procedural step is often beneficial to ensure optimum complexation and removal of the undesirable agent(s) or undesirable excesses thereof. For example, since $Fe^{+3}$ has a greater tendency to form organic complexes than does $Fe^{+2}$, conversion of all iron present in the recovered inorganic salt solution to the +3 oxidation state will result in a more effective removal of the iron. Accordingly, hydrogen peroxide is advantageously added to such recovered inorganic salt solutions, after pH adjustment and prior to the addition of complexing agent, in an amount sufficient to provide between about 10 and 50 ppm, thereby converting essentially all $Fe^{+2}$ to $Fe^{+3}$.

In the practice of a process according to the present invention, it may be especially advantageous under certain conditions to introduce a polymerization activator into the purified, recovered, concentrated aqueous inorganic salt solution, prior to the introduction thereof into the polymerization step, in order to ensure the maintenance of acceptable polymerization activity therein. For example, when the aqueous inorganic salt solution comprises zinc chloride as the principal inorganic salt component, and when the polymerization step is accomplished utilizing a peroxide initiator system, and when the principal metallic ion impurity is ferric ion, an activator is often virtually essential under these conditions. Suitable activators are selected from the group consisting of tartronic acid, dihydroxytartaric acid, ethylenediaminetetraacetic acid, and water soluble aldehydes, such as formaldehyde, acetaldehyde, propionaldehyde, acrolein, crotonaldehyde, butyraldehyde, isobutyraldehyde and benzaldehyde. The water solubility of the aldehyde chosen should be such that it is sufficient to provide a concentration of at least about $1 \times 10^{-4}$ mole percent of the aldehyde in a 60 percent solution of zinc chloride. The activator is advantageously employed in concentrations between about $2 \times 10^{-4}$ and $8 \times 10^{-4}$ mole percent in the purified aqueous inorganic salt solution prior to the introduction thereof into the polymerization reactor. Although the mechanism of such activation is not adequately understood at the present time, its efficacy is without question. To be sure, it is immediately clear to those of skill in the art that some of the compounds utilized as complexing agents for metallic ion impurities also serve as polymerization activators under these conditions. These include ethylenediaminetetraacetic acid, tartronic acid and dihydroxytartaric acid for the acrylonitrile polymer/zinc chloride solvent/peroxide initiator system referred to above.

In the absence of the above-described purification treatment which is the present invention, the polymerization activity of a recycled aqueous inorganic salt solution becomes unsatisfactory after as few as 2 or 3 polymerizations. With the inprovement which is the present invention, on the other hand, the polymerization activity of the recycled aqueous inorganic salt solution remains satisfactory after as many as 20 polymerizations, there being no build up of deleterious metallic ion impurities or organic molecular chain-transfer or chain-terminating by-products during polymerization and spinning. Moreover, the final filamentary vinyl polymer product is superior in fiber heat stability and fiber whiteness to otherwise identical such products which are prepared by otherwise identical processes omitting the purification treatment of the present invention.

The present invention may be better understood by a reference to the following illustrative examples, wherein all parts and percentages are by weight.

EXAMPLE 1

A zinc chloride solution consisting of 58.2 percent zinc chloride and 41.8 percent water was used as a solution polymerization medium. To 85 parts of this medium was added 15 parts of a mixture consisting of 91 percent acrylonitrile, 7.5 percent methyl acrylate, 1.48 percent of a zinc salt of a vinyl sulfonic acid, and 0.02 percent of hydrogen peroxide. Polymerization was effected in standard equipment, after which the vinyl polymer solution was spun through a standard spinnerette into a coagulation bath consisting of 35 percent aqueous zinc chloride. The bath was maintained at a temperature of 30° C. The zinc chloride cencentration of the bath was adjusted by a countercurrent flow of aqueous zinc chloride from a wash bath downstream of the coagulation bath. Overflow from the coagulation bath was concentrated by evaporation of water to 35 percent zinc chloride. The pH was then adjusted to approximately 5.5 (10 percent zinc chloride basis), and hydrogen peroxide, tartronic acid and activated carbon were added in that order in amounts sufficient to provide 25 ppm, 25 ppm, and 0.2 percent respectively. The activated carbon was DARCO S-51, which is supplied by the Atlas Chemicals Division of ICI America, Inc. The temperature of this mixture was controlled at 25° C, and agitation was effected for one half hour with a mechanical stirrer. After filtration of the activated carbon, the filtrate was concentrated to 60 percent zinc chloride by evaporation of water and the pH was adjusted to 3.0 (10 percent zinc chloride basis). Tartronic acid was then added in an amount sufficient to provide about 25 ppm. The so treated solution was then utilized as a polymerization solvent exactly as set forth hereinabove without any deleterious effects on, or diminution of polymerization activity.

EXAMPLE 2

In a process substantially identical to that employed in Example 1 above, a polymerization/purification/-recylde and re-use sequence according to the present invention was accomplished 22 times in succession without any deleterious effects on, or diminution of polymerization activity. The filamentary vinyl polymer gel was continuously washed countercurrently with water, stretched, finished, crimped, dried, cut into staple lengths and baled. Fiber heat stability and fiber whiteness, as determined according to the procedures set forth below, were excellent, surpassing such properties of otherwise identical filamentary products which were prepared by similar processes omitting the purification step which is the improvement according to the present invention.

Fiber Heat Stability: a fiber pad is subjected to dry heat at 125° C for 45 seconds and 200° C for 5 minutes. The heat stability of the fiber is determined as a percentage decrease in reflectance (white light) of the fiber pad.

Fiber Whiteness: this is determined as the reflectance of white light from a pad of the fiber compared with the reflectance from a standard white tile.

EXAMPLE 3

In each of a series of individual experimental runs, a vinyl monomer or mixture thereof was polymerized in a concentrated aqueous inorganic salt solution to produce a vinyl polymer solution, employing standard techniques and equipment. The resulting vinyl polymer solution was then spun through a spinnerette into a coagulating bath containing an aqueous solution of the same inorganic salt as that employed in the polymerization step, the concentration of inorganic salt in the coagulating bath and the temperature thereof being maintained at values which afforded precipitation of the vinyl polymer to form a coherent filamentary gel. The filamentary gel so produced was washed countercurrently with water, and the aqueous inorganic salt solution was recovered from the washing and coagulation steps by concentrating the combined effluents thereof. The recovered aqueous inorganic salt solution was purified by complexing metallic ion impurities and adsorbing the resulting metal complexes along with organic molecular impurities on activated carbon. In these runs a polymerization activator was introduced into the purified aqueous inorganic salt solution, prior to the recycling thereof, in an amount sufficient for the maintenance of acceptable polymerization activity. The so-treated recovered aqueous inorganic salt solution in each case was then introduced into the reactor in the polymerization step without any deleterious effects on, or diminution of polymerization activity therein. The results of these individual runs are summarized in the following Table 1.

TABLE 1

| Run No. | Vinyl Monomer (Mixture) | Polymerization Initiator, % | Inorganic Salt Solution As Polymerization/ Spinning Medium | Complexing Agent, ppm in Recovered Salt Solution | Activated Carbon, % | Polymerization Activator, ppm | Polymerization Quality of Treated Salt Solution |
|---|---|---|---|---|---|---|---|
| 1. | 15 parts of mixture comprising 91% acrylonitrile 7.5% methylacrylate 1.5% zinc salt of vinyl sulfonic acid | $H_2O_2$ 0.02% | 85 parts of 58% $ZnCl_2$ | 2,4-pentanedione 200 ppm | NUCHAR(D-12), 0.2% | formaldehyde, 100 ppm | Excellent |
| 2. | " | " | " | ethylenediamine-tetraacetic acid, 80 ppm | " | tartronic acid, 100 ppm | " |
| 3. | " | " | " | 2,4-pentanedione, 50 ppm | " | acrolein, 100 ppm | " |
| 4. | " | " | " | tartronic acid, 100 ppm | " | acrolein, 100 ppm + formaldehyde, 100 ppm | " |
| 5. | 15 parts of acrylonitrile | " | " | dihydroxytartaric acid, 100 ppm | " | ethylenediamine-tetraacetoc acid, 80 ppm | " |

What is claimed is:

1. In the continuous process for producing a filamentary vinyl polymer including the procedural steps of
   a. polymerizing a vinyl monomer in a concentrated aqueous inorganic salt solution to produce a vinyl polymer solution;
   b. spinning the resulting vinyl polymer solution through a spinnerette into a coagulating bath containing an aqueous solution of the same inorganic salt as that employed in the polymerization step, the concentration of inorganic salt in the coagulating bath being maintained at a level which affords precipitation of the vinyl polymer to form a coherent filamentary gel;
   c. washing the vinyl polymer filamentary gel so produced;
   d. recovering the concentrated aqueous inorganic salt solution from the washing and coagulation steps by concentrating the combined effluents thereof; and
   e. recycling the recovered concentrated aqueous inorganic salt solution into the polymerizing step;
in which process metallic ion and organic molecular impurities accumulate in the recovered concentrated aqueous inorganic salt solution; the improvement in such process which comprises purifying the recovered aqueous inorganic salt solution prior to the recycling and re-use thereof by complexing the metallic ion impurities and adsorbing the resulting metal complexes along with organic molecular impurities on activated carbon.

2. The process improvement of claim 1, wherein the vinyl polymer is an acrylonitrile polymer or interpolymer.

3. The process improvement of claim 2, wherein the aqueous inorganic salt solution comprises zinc chloride as the principal inorganic salt component, the polymerization step is accomplished utilizing a peroxide initiator system, and the principal metallic ion impurity is ferric ion.

4. The process improvement of claim 3, wherein complexation of the metallic ion impurities is accomplished by means of a complexing agent selected from the group consisting of tartronic acid, dihydroxytartaric acid, ethylenediaminetetraacetic acid, and 2,4-pentanedione.

5. The process improvement of claim 3, which additionally comprises introducing into the recovered concentrated aqueous inorganic salt solution, prior to the recycling thereof, a polymerization activator selected from the group consisting of tartronic acid, dihydroxytartaric acid, ethylenediaminetetracetic acid, and water-soluble aldehydes, in an amount sufficient for the maintenance of acceptable polymerization activity.

* * * * *